Oct. 25, 1927.  
C. HURLEY  
1,646,537  
SHEET METAL CONTAINER  
Filed Jan. 19, 1926
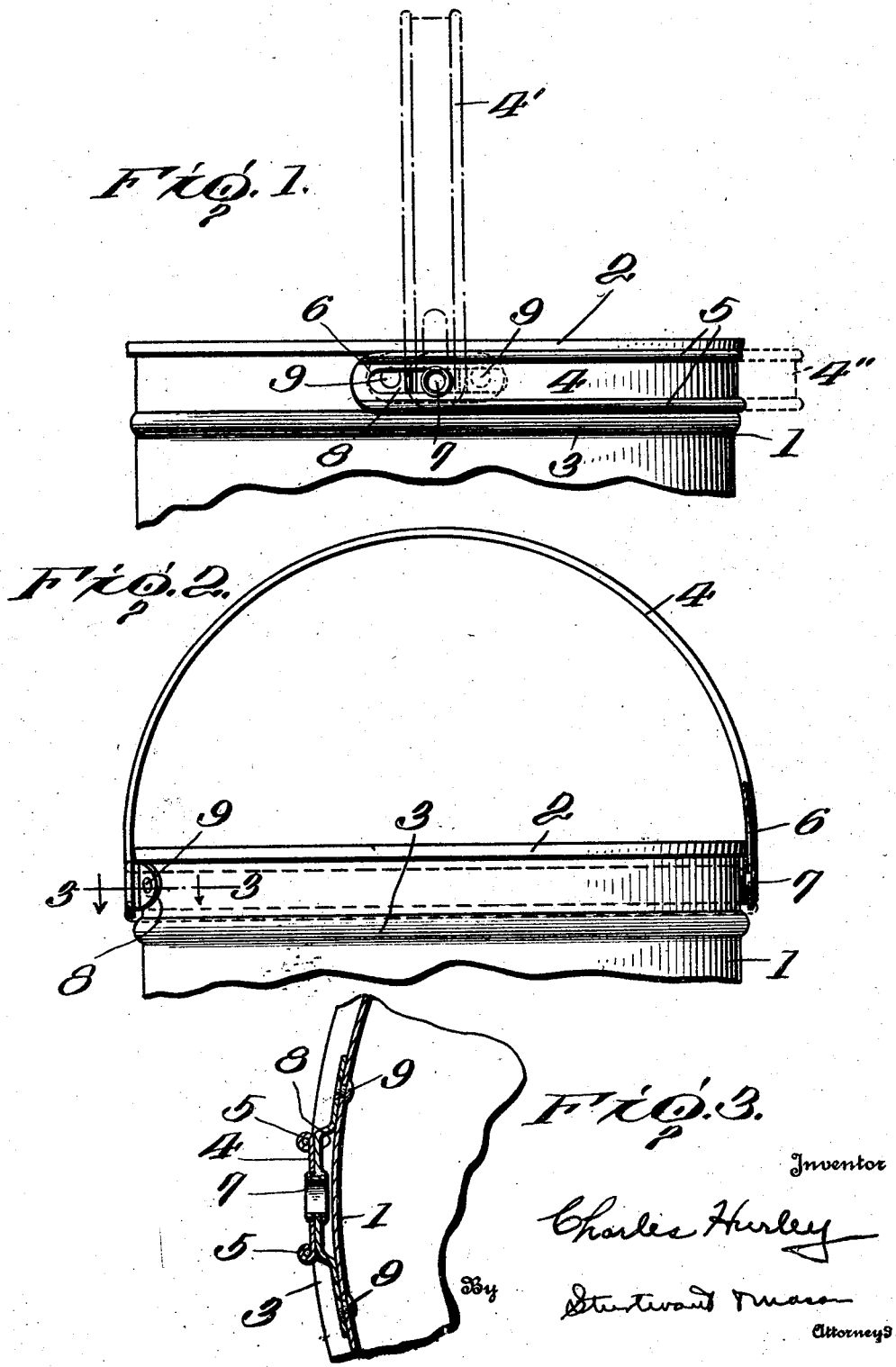

Patented Oct. 25, 1927.

1,646,537

UNITED STATES PATENT OFFICE.

CHARLES HURLEY, OF JERSEY CITY, NEW JERSEY, ASSIGNOR TO CONTINENTAL CAN COMPANY, INC., OF NEW YORK, N. Y., A CORPORATION OF NEW YORK.

SHEET-METAL CONTAINER.

Application filed January 19, 1926. Serial No. 82,299.

The invention relates to new and useful improvements in sheet metal containers, and more particularly to a container of the type shown in the Patent No. 1,568,359, granted January 5, 1926, to Frederick M. Assmann.

An object of the invention is to provide a sheet metal container of the above type having a flat bail, with means for attaching the bail to the container body, so that the bail when turned down into a plane parallel with the top of the container, may be moved to a nested position concentric with the center of the container, and when so nested, the bail lies substantially within the circumference of the outer edge of the double seam joining the end of the container to the body portion thereof.

In the drawings—

Figure 1 is a side view of a container embodying the invention, with the bail shown in nested position in full lines, in raised position in broken lines, and in turned down position in dotted lines, prior to the nesting of the bail;

Fig. 2 is a side view of the container with the bail raised and one end of the bail broken away to show the connection thereof to the container body, and Fig. 3 is a sectional view on the line 3—3 of Fig. 2.

The improved container consists of a cylindrical body portion 1 preferably made of tin. This cylindrical body portion may be made in any suitable way. The upper end of the container body is preferably provided with an end which is secured thereto by a double seam. This double seam makes a projecting bead. A short distance below the projecting bead of the double seam is a beaded rib formed in the body portion. The bail is a flat bail and is secured at each end to a pivot member carried by the body portion of the pail. The bail has an elongated slot which receives the pivot member. When the bail is turned down to horizontal position, that is into a plane substantially parallel with the upper end of the container body, it can be moved horizontally to a nested position, and when so moved, the bail will conform to and fit close to the container body and lie between the double seam bead and the rib below the same. When so nested, the pail may be readily rolled for applying a label thereto, and a series of pails can be packed in a crate very close together, as the bail does not in any way interfere with the nesting of the containers close together. When it is desired to use the bail for carrying the container, it is turned to upright position.

Referring more in detail to the drawings, the improved container consists of a body portion 1 having the upper end secured thereto by a double seam 2 which forms a projecting bead. At a slight distance below the projecting bead 2 of the double seam, is a hollow bead 3 forming a rib in the body portion. The bail 4 is a flat bail. The edges 5, 5 of the bail are rolled so as to strengthen the bail and prevent the edges of the bail from cutting the hand of one carrying the container. The container is particularly designed for storing heavy liquids, such as paint or the like. The bail is provided with an elongated slot 6 at each end thereof. This elongated slot 6 is adapted to engage a pivot member 7. Attached to the body portion of the container are ears 8. These ears are located at diametrically opposed points on the container body, and are secured thereto by suitable rivets 9, 9. Prior to the attaching of the ear to the container body, a rivet is attached to the ear and the bail which forms the pivot member 7. This rivet is headed at each end thereof so as to hold it in engagement with the ear and bail, but the heads of the rivets are not drawn down so tightly as to prevent the bail from turning relative to the ear, or sliding relative to the ear. The pivot member 7 is located in the elongated slot 6 of the bail and the bail may be moved so as to shift the pivot member from one end of the slot to the other.

When the bail is in upright position as shown by the broken lines at 4' in Fig. 1, it may be readily used for carrying the container. In this position, the pivot members are at the lower ends of the slots 6. When the bail is turned to the broken line position indicated at 4'' in said figure, the pivot members are still at the outer ends of the slots 6. The bail is now in horizontal position or in a plane substantially parallel with the upper end of the container body. When in this position, the bail may be moved so as to be nested between the bead 2 of the double seam and the rib 3 in the container body. This is accomplished by the slots in the bail sliding along the pivot members. The bail is of such size and shape as to substantially conform to the outer surface of the container body when nested as indicated in Fig. 1. The bead 2 of the double seam at the upper end of the container body is of substantially the same diameter as the bail, and the bail, when nested, is positioned so as to be concentric with the center of the container end. In other words, when the bail is in nested position, the container can be rolled on the bead 2, and the bail will not in any way interfere with the rolling of the container. This nesting of the bail so that the container can be readily rolled, has a great advantage in the applying of a label to the container body. Furthermore, the nesting of the bail permits a series of containers to be placed side by side in a crate for shipment, or for storing. When it is desired to use the bail for carrying the container body, it is moved outwardly to the dotted line position in Fig. 1, and then is turned to the upright position shown in broken lines in this figure, and in full lines in Fig. 2.

It is obvious that minor changes in the details of construction and arrangement of the parts may be made without departing from the spirit of the invention as set forth in the appended claim. It is also obvious that from certain aspects of the invention, the shape of the container body may be other than cylindrical, but whatever the shape of the container body may be, the bail will be similarly shaped so that it may be nested relative to the body portion of the container when slid endwise on its pivot members.

Having thus described the invention, what I claim as new and desire to secure by Letters-Patent, is—

A sheet metal container including a cylindrical body portion having a projecting bead formed therein at the upper edge thereof, a flat semi-circualr sheet metal bail conforming in curvature to the wall of the cylindrical body, said bail having the edges thereof inturned and the ends thereof provided with elongated slots, and pivot members secured to said body portion at diametrically opposite points, said pivot members extending through the respective elongated slots and having heads overlapping the side walls of the slots, whereby said bail when turned to horizontal position can be moved so as to nest the bail beneath the bead at the upper end of the container body.

In testimony whereof, I affix my signature.

CHARLES HURLEY.